United States Patent
Tian et al.

(10) Patent No.: US 10,234,947 B2
(45) Date of Patent: Mar. 19, 2019

(54) WEARABLE APPARATUS, VIRTUAL REALITY METHOD AND TERMINAL SYSTEM

(71) Applicants: BOE TECHNOLOGY GROUP CO., LTD., Beijing (CN); HEFEI XINSHENG OPTOELECTRONICS TECHNOLOGY CO., LTD., Hefei, Anhui (CN)

(72) Inventors: Jian Tian, Beijing (CN); Ming Zhang, Beijing (CN); Xinbin Tian, Beijing (CN); Min He, Beijing (CN)

(73) Assignees: BOE TECHNOLOGY GROUP CO., LTD., Beijing (CN); HEFEI XINSHENG OPTOELECTRONICS TECHNOLOGY CO., LTD., Hefei, Anhui (CN)

( * ) Notice: Subject to any disclaimer, the term of this patent is extended or adjusted under 35 U.S.C. 154(b) by 0 days.

(21) Appl. No.: 15/657,799

(22) Filed: Jul. 24, 2017

(65) Prior Publication Data
US 2018/0024636 A1 Jan. 25, 2018

(30) Foreign Application Priority Data
Jul. 25, 2016 (CN) .......................... 2016 1 0592581

(51) Int. Cl.
*G06F 3/16* (2006.01)
*G06F 3/01* (2006.01)
(Continued)

(52) U.S. Cl.
CPC .............. *G06F 3/016* (2013.01); *G06F 1/163* (2013.01); *G06F 3/011* (2013.01); *G06F 3/014* (2013.01);
(Continued)

(58) Field of Classification Search
CPC .... G06F 2203/013; G06F 3/011; G06F 3/016; G08B 6/00
(Continued)

(56) References Cited

U.S. PATENT DOCUMENTS 6,628,195 B1 * 9/2003 Coudon ................ A61F 11/045
340/407.1
8,823,603 B1 9/2014 Kim et al.
(Continued)

FOREIGN PATENT DOCUMENTS

CN 103294202 A 9/2013
CN 104857704 A 8/2015
(Continued)

OTHER PUBLICATIONS

First Taiwan Office Action dated Mar. 22, 2018; Appln. No. 106124875.
(Continued)

*Primary Examiner* — Ojiako K Nwugo
(74) *Attorney, Agent, or Firm* — Ladas & Parry LLP; Loren K. Thompson

(57) ABSTRACT

A wearable apparatus is provided, which can express information in more dimensions. The wearable apparatus includes a signal receiving module, a signal processing module, at least one signal generating module and at least one signal outputting module, which are all disposed on a case body. A virtual reality method and a terminal system are further provided.

16 Claims, 5 Drawing Sheets

(51) Int. Cl.
*G08B 6/00* (2006.01)
*G06F 1/16* (2006.01)

(52) U.S. Cl.
CPC .......... *G08B 6/00* (2013.01); *G06F 2203/013* (2013.01); *G06F 2203/0331* (2013.01)

(58) Field of Classification Search
USPC .......................................... 340/407.1, 407.2
See application file for complete search history.

(56) References Cited

U.S. PATENT DOCUMENTS

| | | | |
|---|---|---|---|
| 2015/0070150 A1* | 3/2015 | Levesque | G06F 3/016 340/407.1 |
| 2016/0006352 A1 | 1/2016 | Hang et al. | |
| 2016/0012688 A1* | 1/2016 | Eagleman | G06F 3/016 340/407.1 |
| 2016/0033772 A1 | 2/2016 | Han | |
| 2016/0203685 A1* | 7/2016 | Schwartz | G09B 21/003 340/407.1 |

FOREIGN PATENT DOCUMENTS

| | | |
|---|---|---|
| CN | 105353923 A | 2/2016 |
| TW | 201606352 A | 2/2016 |
| WO | 2013/049248 A2 | 4/2013 |

OTHER PUBLICATIONS

The First Chinese Office Action dated May 18, 2018; Appln. No. 201610592581.1.

\* cited by examiner

WEARABLE APPARATUS, VIRTUAL REALITY METHOD AND TERMINAL SYSTEM

TECHNICAL FIELD

Embodiments of the present disclosure relate to the field of electronics, and in particular to a wearable apparatus, a virtual reality method and a terminal system.

BACKGROUND

In modern life, we receive large amounts of information through various media. The information may be output by a display terminal mainly in the form of visual information, auditory information or both. Such information can only be flattening information. Despite of the existing stereo display technology or other similar technologies, we still receive such information by vision. Generally, such information is based on the two dimensions of vision and audition. How to express information in more dimensions is a problem that cannot be solved by existing technologies.

SUMMARY

Embodiments of the present disclosure provide a wearable apparatus, a virtual reality method and a terminal system, which can express information in more dimensions.

In a first aspect, a wearable apparatus is provided, comprising a signal receiving module, a signal processing module, at least one signal generating module and at least one signal outputting module, which are disposed on a case body, wherein the signal receiving module is configured to receive stimulating signals generated based on multimedia signals input to a display terminal, the signal processing module is connected with the signal receiving module and configured to convert the stimulating signals into voltages signals or current signals so as to generate converted signals, the at least one signal generating module is connected with the signal processing module and configured to generate sensation signals from the converted signals, the sensation signals comprising at least one of PWM pulse signals, electromagnetic signals and electrothermic signals, and each of at least one signal outputting module is connected with the signal generating module it corresponds to, and configured to output the sensation signals to the body of a person.

For example, the signal receiving module receives the stimulating signals in a wired or wireless way.

For example, the wearable apparatus further comprise a signal amplifying module, wherein the signal amplifying module is configured to filter and amplify the sensation signals.

For example, the signal amplifying module is configured to filter and amplify the converted signals.

For example, the sensation signals are PWM pulse signals, and the signal outputting module comprises at least one electrode.

For example, the sensation signals are electromagnetic signals, and the signal outputting module comprises at least one set of electromagnetic coils.

For example, the sensation signals are electrothermic signals, and the signal outputting module comprises at least one set of heat generating and conducting assemblies.

For example, the case body comprises at least one of a ring, a helmet, gloves and a head-mounted ring.

For example, the wearable apparatus further comprises a power supply that is configured to supply power to the wearable apparatus.

In a second aspect, a virtual reality method is provided, comprising: receiving stimulating signals generated based on multimedia signals input to a display terminal, converting the stimulating signals into voltage signals or current signals to generate converted signals, generating sensation signals from the converted signals, the sensation signals comprising at least one of PWM pulse signals, electromagnetic signals and electrothermic signals, and outputting the sensation signals to the body of a person.

For example, the method further comprises filtering and amplifying the converted signals before generating the sensation signals from the converted signals.

For example, the method further comprises filtering and amplifying the sensation signals before outputting the sensation signals to the body of a person.

For example, the sensation signals are PWM pulse signals.

For example, the sensation signals are electromagnetic signals.

For example, the sensation signals are electrothermic signals.

In a third aspect, a terminal system is provided, comprising a display terminal and the wearable apparatus, wherein the display terminal is configured to send the stimulating signals generated from the multimedia signals to the wearable apparatus.

For example, the multimedia signals comprise display signals and audio signals, the display terminal comprises a display module and an audio output module, the display module is configured to output the display signals, and the audio output module is configured to output the audio signals.

For example, the multimedia signals are in synchronization with the stimulating signals.

In the solution described above, there is provided a wearable apparatus, which includes a signal receiving module, a signal processing module, at least one signal generating module and at least one signal outputting module, which are disposed on a case body. The signal processing module is used to receive stimulating signals generated based on multimedia signals input to a display terminal. The signal processing module is connected with the signal receiving module and used to convert the stimulating signals into voltages signals or current signals so as to generate converted signals. The at least one signal generating module is connected with the signal processing module and used to generate sensation signals from the converted signals, the sensation signals comprising at least one of pulse width modulated pulse signals, electromagnetic signals and electrothermic signals. Each of the at least one signal outputting module is connected with the signal generating module it corresponds, and used to output the sensation signals to the body of a person. Since the multimedia signals input to a display terminal may be output by the display terminal as visual signals and/or audio signals, and meanwhile the wearable apparatus can convert stimulation signals generated based on the multimedia signals into sensation signals and send the sensation signals to the body of a person, information can be expressed in more dimensions.

BRIEF DESCRIPTION OF DRAWINGS

In order to make the embodiments of the disclosure apparent, the drawings related to the embodiments of the disclosure will be described briefly. Apparently, the described embodiments are just a part of the embodiments of the disclosure. For those skilled in the art, he or she can obtain other figure(s) according to these figures, without any inventive work.

DETAILED DESCRIPTION

The technical solutions of the embodiments will be described in a clearly and fully understandable way in connection with the drawings related to the embodiments of the disclosure. Apparently, the described embodiments are just a part but not all of the embodiments of the disclosure. Based on the described embodiments herein, those skilled in the art can obtain other embodiment(s), without any inventive work, which should be within the scope of the disclosure.

In accordance with the principle of the present disclosure, a wearable apparatus can convert stimulating signals it has received into converted signals in the form of voltage signals or current signals and output sensation signals generated from the converted signals to the body of a person; meanwhile since the sensation signals include at least one of pulse width modulated (PWM) pulse signals, electromagnetic signals and electrothermic signals, they can be perceived by the person when output to his body, enabling information to be expressed in more dimensions.

Figure 1:
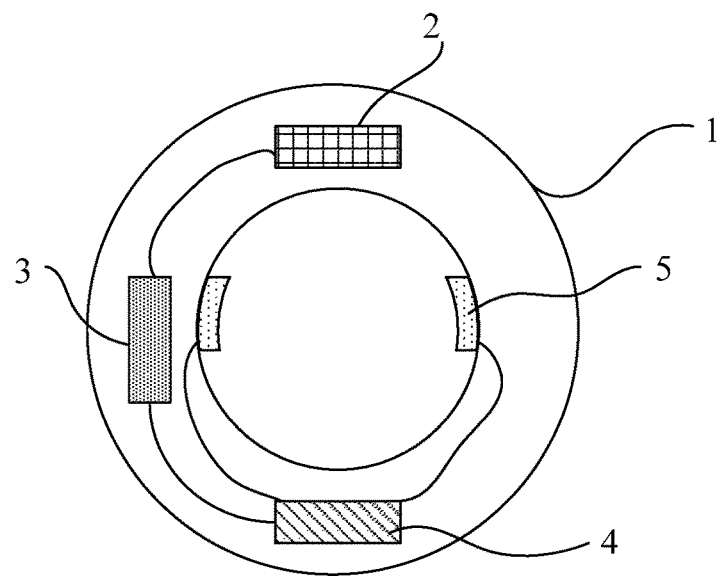
FIG. 1 is a schematic structure diagram of a wearable apparatus provided in an embodiment of the present disclosure.

Specifically, with reference to FIG. 1, an embodiment of the present disclosure provides a wearable apparatus including a signal receiving module 2, a signal processing module 3, at least one signal generating module 4 and at least one signal outputting module 5, which are all disposed on a case body 1.

The signal receiving module 2 is used to receive stimulating signals generated based on multimedia signals input to a display terminal.

The signal processing module 3 is connected to the signal receiving module 2 and used to convert the stimulating signals into voltage signals or current signals so as to generate converted signals.

The at least one signal generating module 4 is connected to the signal processing module 3 and used to generate sensation signals including one least one of PWM pulse signals, electromagnetic signals and electrothermic signals.

Each of the at least one signal outputting module 5 is connected to a corresponding signal generating module 4 and used to output the sensation signals to the body of a person.

It is to be noted that the at least one signal generating module 4 is in one-to-one correspondence with the at least one the signal outputting module 5. For example, if the sensation signals generated by the signal generating module 4 are PWM pulse signals, the signal outputting module 5 may include at least one electrode.

If the sensation signals generated by the signal generating module 4 are electromagnetic signals, the signal outputting module 5 may include at least one set of electromagnetic coils.

If the sensation signals generated by the signal generating module 4 are electrothermic signals, the signal outputting module 5 may include at least one heat generating and conducting assemblies. For example, the electrothermic signals may be current driving signals for the heat generating and conducting assemblies.

The sensation signals may stimulate nerve endings in a part of the person's body so as to be perceived by the person as some tactility experience. The PWM pulse signals, electromagnetic signals and electrothermic signals are provided only as examples of the sensation signals, and of course other types of sensation signals capable of driving the signal outputting module to provide a person with other tactility experiences, such as, friction, air flow or the like also fall in the scope claimed by the present application.

The wearable apparatus provided in the solution described above includes a signal receiving module, a signal processing module, at least one signal generating module and at least one signal outputting module. The signal receiving module is used to receive stimulating signals generated based on multimedia signals input to the display terminal. The signal processing module is connected with the signal receiving module and used to convert the stimulating signals into voltage signals or current signals so as to generate converted signals. The at least one signal generating module is connected with the signal processing module and used to generate sensation signals from the converted signals, the sensation signals including at least one of PWM pulse signals, electromagnetic signals and electrothermic signals. Each of the at least one signal outputting module is connected with a corresponding signal generating module and used to output sensation signals to the body of a person. Since the multimedia signals input to a display terminal may be output by the display terminal as visual signals and/or audio signals and meanwhile the wearable apparatus can convert stimulating signals generated based on the multimedia signals into sensation signals and send the sensation signals to the body of a person, information can be expressed in more dimensions.

For example, the signal receiving module receives stimulating signals in a wired way, and of course it may also receive stimulating signals in a wireless way. Herein the way in which the wearable apparatus receives stimulating signals is not limited in any way.

Figure 2:
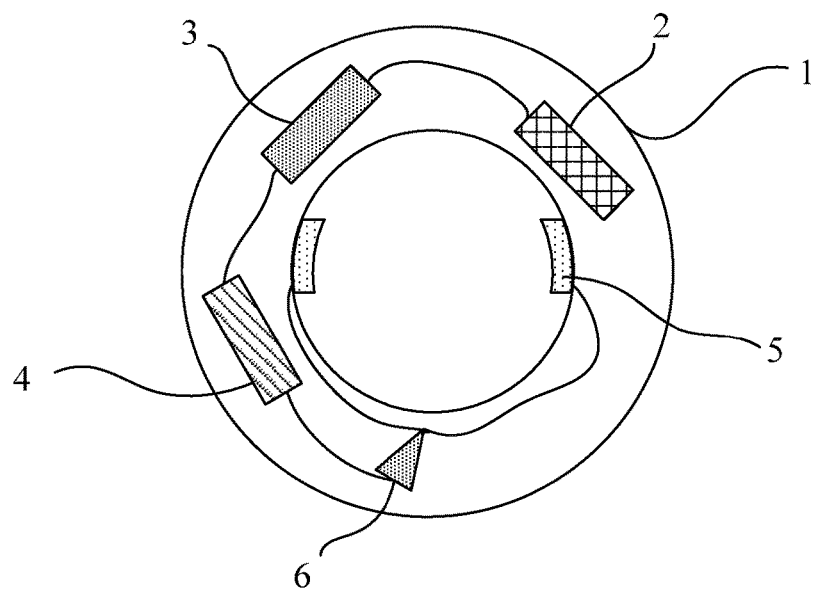
FIG. 2 is a schematic structure diagram of a wearable apparatus provided in another embodiment of the present disclosure.

In a preferable implementation, as shown in FIG. 2, the wearable apparatus further includes a signal amplifying module 6 that may be disposed between the signal generating module 4 and the signal outputting module 5 and used to filter and amplify the sensation signals. Thereby, the problem of underpower that may occur when sensation signals are directly output to the signal outputting module 5 is avoided and interfering signals can be filtered out of the sensation signals.

Figure 3:
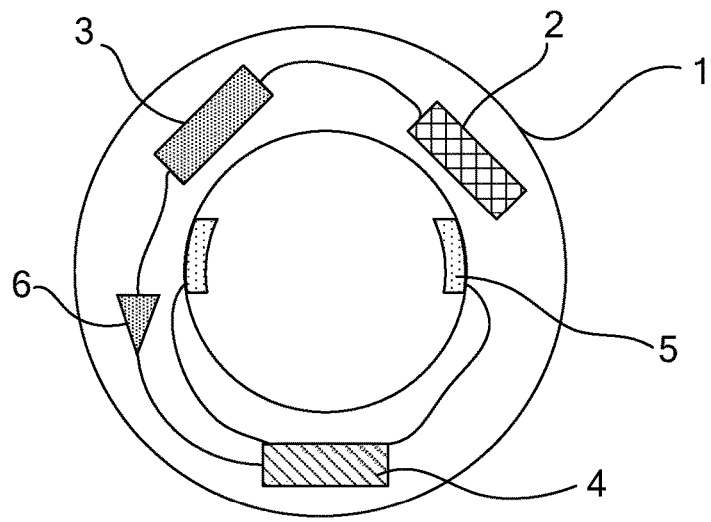
FIG. 3 is a schematic structure diagram of a wearable apparatus provided in yet another embodiment of the present disclosure.

Of course, as shown in FIG. 3, the signal amplifying module 6 may also be disposed between the signal processing module 3 and the signal generating module 4 and used to filter and amplify the converted signals. Similarly, the signal amplifying module 6 is used to amplify the converted signals in power and filter interfering signals out of the converted signals.

Figure 4:
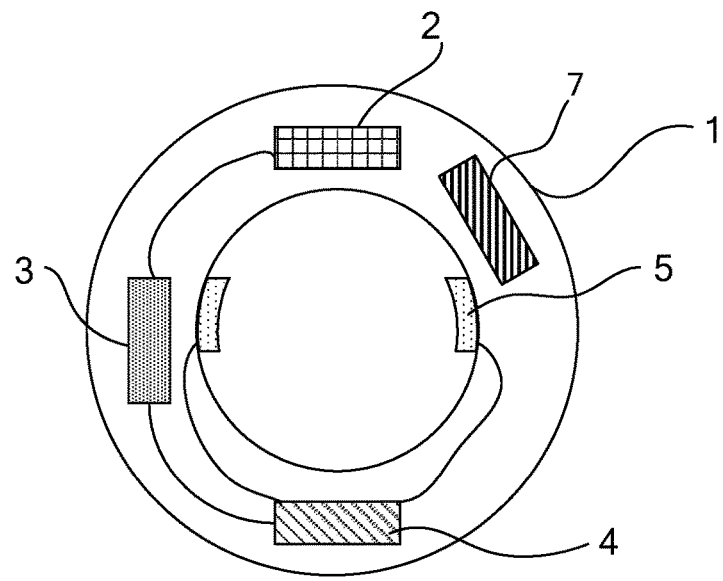
FIG. 4 is a schematic structure diagram of a wearable apparatus provided in yet another embodiment of the present disclosure.

As shown in FIG. 4, the wearable apparatus further includes a power supply 7 that is used to supply power to the wearable apparatus. Furthermore, the case body of the wearable apparatus may take the form of at least one of a circular ring, a helmet, gloves and a head-mounted ring. The case body 1 may be made of metal, organic materials or the like. The wearable apparatus described above may be applied in various fields, such as, display, games, manipulating devices, healthcare etc.

It is to be noted that the signal receiving module 2 may be a port circuit or any other type of signal receiving circuit disposed on the wearable apparatus and furthermore the signal processing module 3, the signal generating module 4 and the signal amplifying module 6 may be separate processors or may be integrated into one processor, or otherwise may be stored as program codes in the memory of a controller and can be accessed and executed by a processor of the controller to perform the functions of the signal processing module 3, the signal generating module 4 and the signal amplifying module 6. As used herein, the term "processor" may refer to a central processing unit (CPU), an application specific integrated circuit (ASIC) or one or more integrated circuits configured to implement embodiments of the present disclosure.

Based on the wearable apparatus described above, as shown in FIG. 5, an embodiment of the present disclosure provides a virtual reality method including the following steps.

Figure 5:
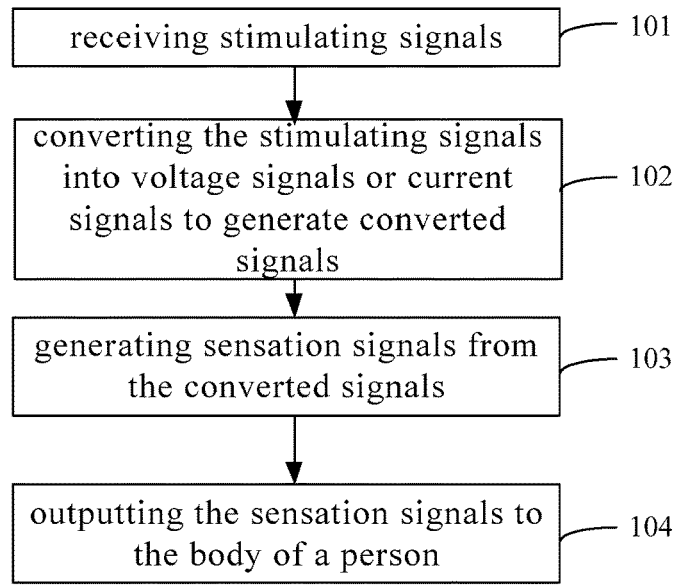
FIG. 5 is a flow chart illustrating a virtual reality method provided in an embodiment of the present disclosure.

As shown in FIG. 5, an embodiment of the present disclosure provides a virtual reality method including:

step 101: receiving stimulating signals generated based on the multimedia signals input to a display terminal;

step 102: converting the stimulating signals into voltage signals or current signals to generate converted signals;

step 103: generating sensation signals from the converted signals, the sensation signals including at least one of PWM pulse signals, electromagnetic signals and electrothermic signals; and step 104: outputting the sensation signals to the body of a person, wherein the sensation signals may stimulate nerve endings in a part of the person's body so as to be perceived by the person as some tactility experience.

In the solution described above, there is provided a wearable apparatus, which can receive stimulating signals, convert the stimulating signals into voltage signals or current signals to generate converted signals, generate sensation signals from the converted signals and output the sensation signals to the body of a person. The stimulating signals are generated based on the multimedia signals input to a display terminal and the sensation signals include at least one of PWM pulse signals, electromagnetic signals and electrothermic signals. Since the multimedia signals input to a display terminal may be output by the display terminal as visual signals and/or audio signals and meanwhile the wearable apparatus can convert stimulating signals generated based on the multimedia signals into sensation signals and send the sensation signals to the body of a person, information can be expressed in more dimensions.

Figure 6:
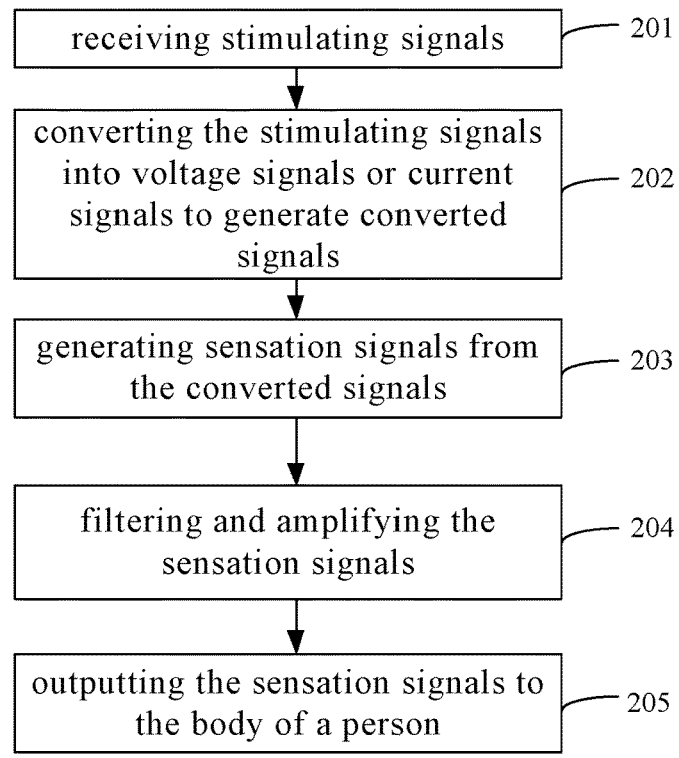
FIG. 6 is a flow chart illustrating a virtual reality method provided in another embodiment of the present disclosure.

FIG. 6 shows another virtual reality method, which includes:

step 201: receiving stimulating signals generated based on the multimedia signals input to a display terminal;

step 202: converting the stimulating signals into voltage signals or current signals to generate converted signals;

step 203: generating sensation signals from the converted signals, the sensation signals including at least one of PWM pulse signals, electromagnetic signals and electrothermic signals;

step 204: filtering and amplifying the sensation signals; and step 205: outputting the sensation signals to the body of a person.

In the solution described above, since the sensation signals are output to the body of a person after being filtered and amplified, the problem of underpower that may occur when sensation signals are directly output to the body of a person is avoided and interfering signals can be filtered out of the sensation signals.

Figure 7:
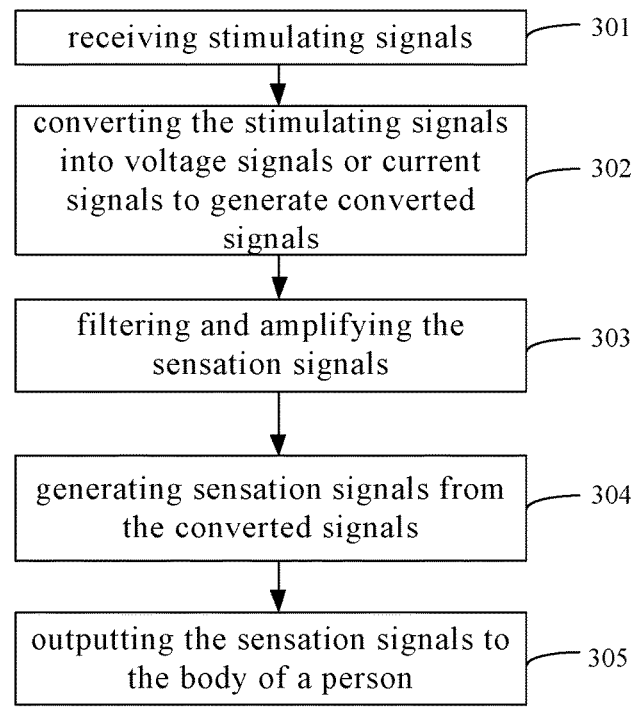
FIG. 7 is a flow chart illustrating a virtual reality method provided in yet another embodiment of the present disclosure.

As shown in FIG. 7, there is provided a virtual reality method, which includes:

step 301: receiving stimulating signals generated based on the multimedia signals input to a display terminal;

step 302: converting the stimulating signals into voltage signals or current signals to generate converted signals;

step 303: filtering and amplifying the converted signals; and step 304: generating sensation signals from the converted signals, the sensation signals including at least one of PWM pulse signals, electromagnetic signals and electrothermic signals; and step 305: outputting the sensation signals to the body of a person.

In the solution described above, the converted signals are amplified in power and filtered to remove interfering signals therein before generation of the sensation signals. The sensation signals can similarly avoid underpower and be protected from interfering signals that may otherwise be introduced therein.

Figure 8:
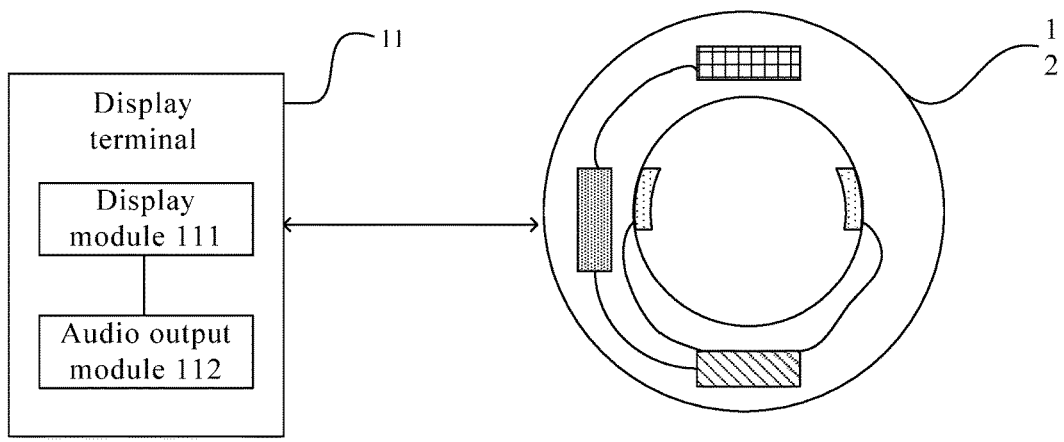
FIG. 8 is a schematic structure diagram of a terminal system provided in an embodiment of the present disclosure.

As shown in FIG. 8, there is provided a terminal system including a display terminal 11 and the wearable apparatus 12 provided in any embodiment described above.

The display terminal 11 is used to send stimulating signals generated based on the multimedia signals to the wearable apparatus 12.

In the solution described above, since the multimedia signals input to a display terminal may be output by the display terminal as visual signals and/or audio signals and meanwhile the wearable apparatus can convert stimulating signals generated based on the multimedia signals into sensation signals and send the sensation signals to the body of a person, information can be expressed in more dimensions.

The multimedia signals include display signals and audio signals.

The display terminal 11 includes a display module 111 and an audio output module 112.

The display module 111 is used to output the display signals.

The audio output module 112 is used to output the audio signals.

Figure 9:
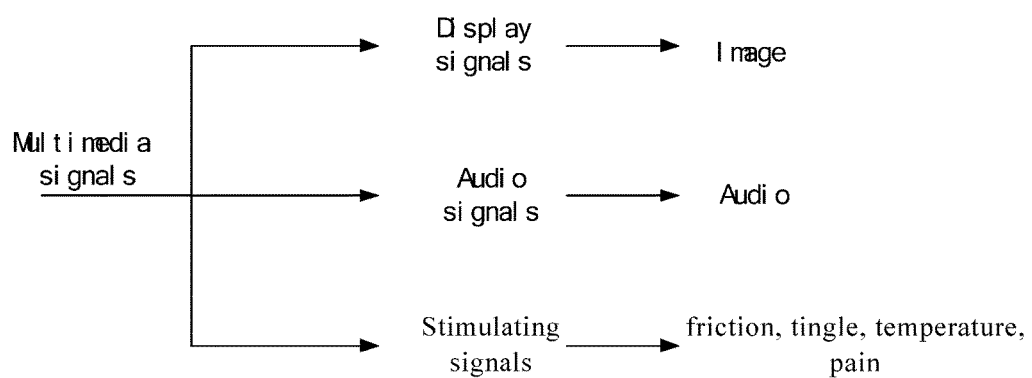
FIG. 9 is a schematic diagram illustrating the signal flow of a terminal system provided in an embodiment of the present disclosure.

Accordingly, as show in FIG. 9, with the means described above, multimedia signals may be expressed at least in the three dimensions of vision (images), audition (sounds) and sensation (e.g. friction, tingle, temperature, pain or the like).

In addition, the multimedia signals are in synchronization with the stimulating signals, so that signal expressions in multiple dimensions may be synchronized. For example, when a picture of fire is displayed, stimulating signals for the sensation signals corresponding to a temperature expression may be generated and sent to the wearable apparatus in synchronization to make the body of a person feel a feeling of temperature. The display terminal may be any product or component with display functionality, such as an electronic paper display, a mobile telephone, a tablet computer, a TV set, a display, a notebook computer, a digital picture frame, a navigator or the like.

What are described above is related to the illustrative embodiments of the disclosure only and not limitative to the scope of the disclosure. Obvious variations and replacement by any one of the skilled person in the art in the technical scope of the disclosure should be all covered in the scope of this disclosure. The scopes of the disclosure are defined by the accompanying claims.

The present application claims the priority of the Chinese Patent Application No. 201610592581.1 filed on Jul. 25, 2016, which is incorporated herein in its entirety by reference as part of the disclosure of the present application.

What is claimed is:

1. A wearable apparatus, comprising a signal receiving module, a signal processing module, at least one signal generating module and at least one signal outputting module, which are disposed on a case body, wherein
   the signal receiving module is configured to receive stimulating signals generated based on multimedia signals input to a display terminal,
   the signal processing module is connected with the signal receiving module and configured to convert the stimulating signals into voltages signals or current signals so as to generate converted signals,
   the at least one signal generating module is connected with the signal processing module and configured to generate sensation signals from the converted signals, the sensation signals comprising at least one of PWM pulse signals, electromagnetic signals and electrothermic signals, and
   each of at least one signal outputting module is connected with the signal generating module it corresponds to, and configured to output the sensation signals to the body of a person;
   wherein, the sensation signals are electromagnetic signals, and the signal outputting module comprises at least one set of electromagnetic coils;
   or
   the sensation signals are electrothermic signals, and the signal outputting module comprises at least one set of heat generating and conducting assemblies.

2. The wearable apparatus of claim 1, wherein, the signal receiving module receives the stimulating signals in a wired or wireless way.

3. The wearable apparatus of claim 2, further comprising a signal amplifying module, wherein the signal amplifying module is configured to filter and amplify the sensation signals.

4. The wearable apparatus of claim 3, wherein the signal amplifying module is configured to filter and amplify the converted signals.

5. The wearable apparatus of claim 1, further comprising a signal amplifying module, wherein the signal amplifying module is configured to filter and amplify the sensation signals.

6. The wearable apparatus of claim 5, wherein the signal amplifying module is configured to filter and amplify the converted signals.

7. The wearable apparatus of claim 1, wherein,
   the sensation signals are PWM pulse signals, and the signal outputting module comprises at least one electrode.

8. The wearable apparatus of claim 1, wherein, the case body comprises at least one of a ring, a helmet, gloves and a head-mounted ring.

9. The wearable apparatus of claim 1, further comprising a power supply that is configured to supply power to the wearable apparatus.

10. A terminal system, comprising a display terminal and the wearable apparatus of claim 1, wherein
    the display terminal is configured to send the stimulating signals generated from the multimedia signals to the wearable apparatus.

11. The system of claim 10, wherein, the multimedia signals comprise display signals and audio signals,
    the display terminal comprises a display module and an audio output module,
    the display module is configured to output the display signals, and
    the audio output module is configured to output the audio signals.

12. The system of claim 10, wherein, the multimedia signals are in synchronization with the stimulating signals.

13. A virtual reality method, comprising:
    receiving stimulating signals generated based on multimedia signals input to a display terminal;
    converting the stimulating signals into voltage signals or current signals to generate converted signals;
    generating sensation signals from the converted signals, the sensation signals comprising at least one of PWM pulse signals, electromagnetic signals and electrothermic signals; and
    outputting the sensation signals to the body of a person;
    wherein the sensation signals are electrothermic signals or electromagnetic signals.

14. The method of claim 13, further comprising filtering and amplifying the converted signals before generating the sensation signals from the converted signals.

15. The method of claim 13, further comprising filtering and amplifying the sensation signals before outputting the sensation signals to the body of a person.

16. The method of claim 13, wherein the sensation signals are PWM pulse signals.

* * * * *